Aug. 7, 1934.  P. W. CROWLEY  1,969,259
DEVICE FOR REDUCING THE CAPACITY OF MOLDS AND METHOD OF USING THE SAME
Filed Feb. 20, 1933
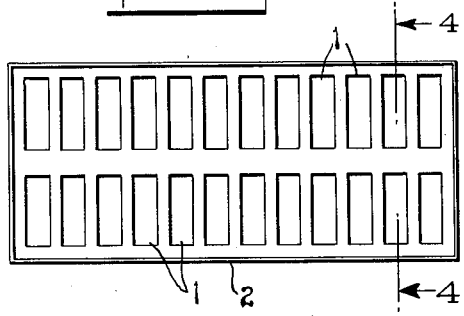
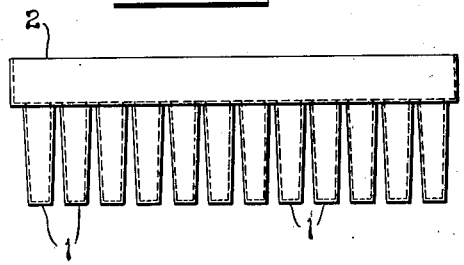
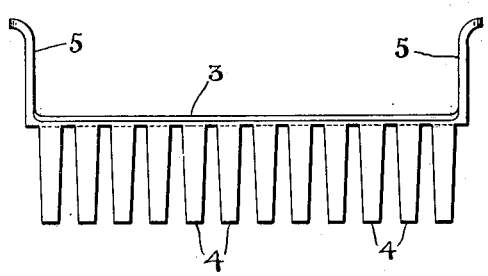
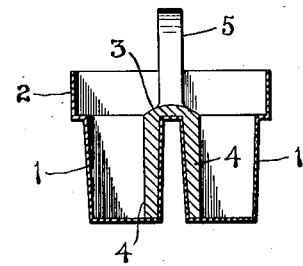
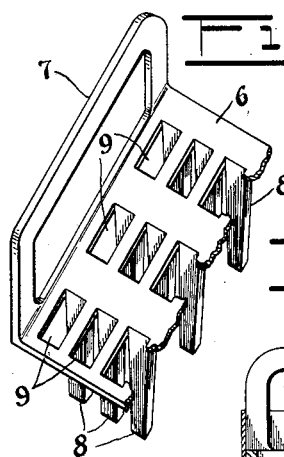
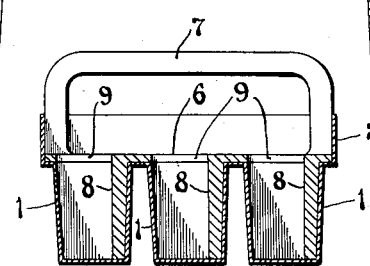
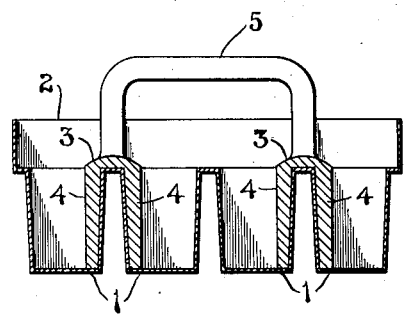
INVENTOR
PAUL W. CROWLEY
BY
his ATTORNEY Patented Aug. 7, 1934

1,969,259

UNITED STATES PATENT OFFICE 1,969,259

DEVICE FOR REDUCING THE CAPACITY OF MOLDS AND METHOD OF USING THE SAME

Paul W. Crowley, Des Moines, Iowa, assignor, by mesne assignments, to Good Humor Corporation of America Application February 20, 1933, Serial No. 657,642

1 Claim. (Cl. 107—19)

This invention relates generally to a device whereby the capacity of a mold may be reduced a predetermined amount and, more specifically, such a device to be employed with molds for the manufacture of frozen confections such as ice cream, water ices and sherbets.

In ordinary commercial practice the mixture from which such a product is made is sometimes partially frozen in bulk in a freezer; then the partially frozen mixture is poured into a mold and subjected to further freezing until it has been hardened to the desired degree.

In the alternative, particularly for the production of certain water ice products, the unfrozen mixture is placed directly in a mold. In either case, the mixture is subjected to subsequent refrigeration until it is hardened to the desired consistency.

Molds for such purposes may consist of a simple box-like receptacle in which the product is frozen into large bricks; or, it may consist of a multiplicity of individual molding units each having a capacity equal to a single serving or unit of the product.

This invention is peculiarly adapted for use with such molds and for that reason the form hereinafter illustrated and described is intended for such use. It will be understood, however, that the invention is not limited to the form shown or to use with molds of any particular form or for any particular purpose.

In the drawing:

Fig. 1 is a diagrammatic plan in perspective of an ice cream mold consisting of a multiplicity of individual molding units;

Fig. 2 is a front elevation of the mold of Fig. 1;

Fig. 3 is a front elevation of the capacity reducing device;

Fig. 4 is a sectional view along the line 4—4 of Fig. 1, showing the device in position within the mold;

Fig. 5 is a view similar to that of Fig. 4 illustrating the capacity reducing device applied to a mold having four rows of molding units;

Fig. 6 is a view in perspective of another form of device; and

Fig. 7 is a sectional view showing the device of Fig. 6 in position in a mold.

The mold illustrated in Fig. 1 consists of a number of symmetrically arranged individual molds 1, opening into a common pan 2. The mixture to be molded is poured into the pan and manipulated by means of a suitable spreader until all the molding units are filled to the top, after which any surplus mixture remaining in the pan is removed.

In this simple manner a number of products of identical proportions are easily and positively secured.

It frequently happens, however, that the manufacturer desires to make a smaller size product. Of course it would be possible to partly fill each molding unit, but such operation upon each unit would be too troublesome and uncertain to be of commercial utility.

To make possible the use of the same molds to obtain a product of any desired volume less than the maximum permitted, with as great uniformity as before without complicating the simple method of use outlined above, the device shown in Fig. 2 is employed. It consists of a plate or bar 3, to which are attached a number of downwardly depending fingers 4, so spaced that the device may be inserted into the mold as a unit with one finger projecting into each molding unit 2. The bar which supports the fingers should, of course, be shaped so as to obstruct the opening into the molding unit as little as possible. The capacity of each molding unit will be reduced to the extent of the space occupied by the finger projecting downwardly into it; consequently, the capacity of each unit may be altered at will through the employment of fingers of any desired dimensions. If desired, the fingers may be removably attached to bar 3, or a number of devices of this sort having fingers of different dimensions may be kept on hand.

In use, the capacity reducing device is inserted into the mold as already described with one finger projected into each molding unit. This is quickly and easily accomplished by means of handles 5, attached to the ends of bar 3; then the mixture is poured into pan 2 in the usual manner and manipulated into the molding units until each is completely filled—after which the surplus mixture is removed from pan 2, as usual. Then the capacity reducing device is removed from the mold whereupon the level of the mixture in each molding unit will, of course, drop as the mixture fills the space left vacant by the finger. There will then be in each of the molding units the same amount of mixture which will be less than the maximum capacity. In this simple manner I make it possible to produce a product of any desired reduced size and of absolute uniformity as to size.

The device in the form shown in Fig. 3 may not be suitable for all molds; for a mold such as shown in Fig. 1 having two parallel rows of molding units, it is, perhaps, the preferred form. The same form can be used in a mold having four rows of molding units simply by employing two of the devices of Fig. 2, one for each pair of rows of molding units, or, if desired for such a mold, two of the devices of Fig. 2 may be joined together by bars connecting the end of bars 3, or by the handle 5, as shown in Fig. 5, to make a single complete unit. For molds having three rows of molding units or units of unusual shape or arrangement a modified form of the device may be preferable such, for example, as that shown in Fig. 6. This consists essentially of a plate 6, adapted to fit within pan 2 and to rest upon the tops of the molding units provided with handles 7, for lifting it and having on its underside the fingers 8 already described. Plate 6 is also pierced by holes 9 registering with that part of the opening of each molding unit which is not occupied by a finger. The plate having been inserted into pan 2 directly above the molding units, the mixture is poured onto it and distributed in the usual manner until the molding units are filled after which the surplus mixture is removed as usual. Then, the plate with the attached fingers is removed and each molding unit will be found to contain the same amount of mixture but less than the full capacity of the unit.

Various forms of this device to meet different requirements will be readily suggested to those skilled in the art. The particular form or construction of the device employed is immaterial to this invention, the two forms shown and described having been selected solely for purposes explaining the nature of the invention.

This invention greatly increases the utility of molding apparatus which manufacturers may have on hand and enables them to use their molds for a great variety of products of different sizes and makes it possible to alter the size of the product practically instantaneously simply by shifting from one device to another having fingers of different dimensions. Furthermore, the normal practice employed in filling the molds may be continued without substantial change or increase in production cost.

Having thus described the invention, I claim:

The method of filling a mold with a predetermined amount of liquid which is less than the full capacity of the mold which consists of first inserting into said mold a body having a displacement equal to the full capacity of the mold less the volume of said liquid, then filling said mold to its reduced capacity, and then removing said body from said mold.

PAUL W. CROWLEY.